United States Patent [19]

Dalke et al.

[11] Patent Number: 4,488,245

[45] Date of Patent: Dec. 11, 1984

[54] METHOD AND MEANS FOR COLOR DETECTION AND MODIFICATION

[75] Inventors: George W. Dalke, Overland Park, Kans.; Peter C. Pugsley, Pinner, England

[73] Assignee: LogE/Interpretation Systems Inc., Overland Park, Kans.

[21] Appl. No.: 366,027

[22] Filed: Apr. 6, 1982

[51] Int. Cl.³ .................... G03F 3/08; G01N 21/25
[52] U.S. Cl. .................... 364/526; 358/80; 356/405
[58] Field of Search .................... 364/498, 524–526, 364/572; 356/402–406; 358/80, 22, 75, 81; 382/54

[56] References Cited

U.S. PATENT DOCUMENTS 4,127,871 11/1978 Sakamoto .................... 358/80
4,258,385 3/1981 Greenberg et al. .................... 358/80
4,414,635 11/1983 Gast et al. .................... 356/405

OTHER PUBLICATIONS

Seaton, W. D., "Instrumental Colour Matching without the Math" *International Dyer and Textile Printer*, 7/5/1966, pp. 20–22.

Hunt, R. W. G., "Objectives in Colour Reproduction" *The Journal of Photographic Science*, vol. 18, 1970, pp. 205–215.

*Primary Examiner*—James D. Thomas
*Assistant Examiner*—Dale M. Shaw
*Attorney, Agent, or Firm*—William D. Hall; Kenneth L. King

[57] ABSTRACT

This specification discloses a method and means for color detection and modification wherein the recognition of color is based on the definition of a three-dimensional color sub-space within a three-dimensional color universe. Chromaticity values are digitized and modeled as a function of brightness or luminance. Three eight-bit words (each having 256 values) are stored for each pixel of a digitized color picture. The first value is an approximation of luminance, while the second and third values represent variations of chromaticity or chrominance. Over sixteen million combinations of color values are available for each of over one million pixels in a 1024×1024 pixel array image. Pattern recognition techniques are used to determine if a given color value lies within the three-dimensional color sub-space. Additional means and method are disclosed to modify or manipulate the color defined by the color sub-space. A high-speed digital processing technique enables the real time modification of any portion of the color image within the display. By means of a unique weighting function, the operator is able to modify or insert colors and to provide a "smooth" edge or a "hard" edge as desired. The invention is particularly suited to the recognition or detection of color values on a textured, shaded and highlighted surface.

45 Claims, 14 Drawing Figures

METHOD AND MEANS FOR COLOR DETECTION AND MODIFICATION

BACKGROUND OF THE INVENTION

The present invention relates to methods and means for color detection and modification. It is particularly suited to color detection systems, color recognition systems, color modifications, and color creation systems.

In color detection systems the invention is particularly useful for the automatic mixing of paints, pigments and dyes, for the sorting of ripe fruit, grains and vegetables, and may also be used in robotic devices in combination with pattern recognition techniques in three-dimensional physical space.

In color modification systems it is particularly suited to the graphic arts industry wherein it may be used as an original graphics generator, in the preparation of four-color separation negatives, in the retouching of specific areas within a color image, and in the preparation of page composites.

In color recognition systems it is suited for geological and agricultural assessments, military reconnaissance, city planning and land use, and coastal oceanography.

In color creation systems it is particularly useful in modifying generated original graphics; in the television industry for modifying artwork and refining Chromakey applications; in the modification of industrial audiovisual slides; and in computer-generated animation devices for the motion picture industry.

The invention as disclosed herein has both color detection and color modification phases. In addition, by virtue of the manner in which the colors are selected, mathematical mensuration of defined color information is easily derivable.

Historically, color analysis has been an extremely difficult and imprecise process. Color recognition devices generally fall into one of three categories, the first of which uses the wavelength of the light to isolate or detect a "pump" spectral color. While spectographic recognition or detection can be quite accurate with respect to such a pure color, it has a significant drawback. Pure wavelength differentiation does not take into account color differences that vary as a function of saturation or luminance. A textured article that is obliquely illuminated by a light source may have many variations in saturation and luminosity, and the color detected by a spectrograph will vary substantially. Spectrographic color detection or recognition is simply not capable of handling all of the differences caused by variations in saturation or luminosity.

A second method of handling color recognition is through the use of digital or analog threshold devices which work primarily at one value of luminance. The incoming colors are filtered to derive a two-axis or two-dimensional color pattern. The threshold devices are then gated to respond to a single color. An example of this type of device appears in U.S. Pat. No. 3,739,078 issued to Peter Pugsley, one of the present co-inventors, and Mouayed Dobouny on June 12, 1973.

A third type of color recognition device recognizes that color is, in fact, a three-dimensional subject. In U.S. Pat. No. 4,110,826 issued to Klaus Mollgaard et al, on Aug. 29, 1978, it is taught that color can be described by a three-dimensional model wherein the x and y axes represent chromaticity and the z axis represents luminance. This reference also teaches the use of coordinate transforms to alter the naturally-occurring shape of the defined color in order to assist in its detection. FIGS. 6A and 6B of the Mollgaard patent show that color values vary as a function of luminance and, in fact, two different colors may overlap on the x,y axis if two different values of luminance are considered.

The color detection circuitry used in the present invention is particularly suited to isolating and detecting colors in a three-dimensional environment. For example, an aerial reconnaissance photograph of a wheat field or a corn field will reveal a textured surface. If the agricultural crop were affected by blight or drought, the severity of the blight or drought could be determined by isolating the color signature of the blighted product and then scanning the entire image to determine the percentage of the image that contained that particular color signature. Prior at color recognition devices generally fail with textured surfaces because of the enormous number of combinations present when all possible values of hue, saturation and luminance are combined.

In addition to color detection, the present invention is equally applicable to color modification, wherein it is desired to modify one particular color within the image. U.S. Pat. No. 3,739,078 to Pugsley, discussed previously, and U.S. Pat. No. 2,799,722 to H. E. J. Neugebauer, both disclose methods of altering the color within a certain localized area of an image. In addition, there are many references, of which Pugsley's U.S. Pat. No. 3,893,166 is an example, which disclose the modification of a specific color component throughout the entire image. Localized color correction is highly useful in the graphic arts industry, wherein it is often desired to modify or retouch a specific image area. Again, prior art devices, when evaluating textured color or articles with three-dimensional modeling, have proved to be less than satisfactory in isolating the image area to be corrected. For example, a man's shirt pictured in a catalog may have been manufactured with a dye having a single set of values definable in terms of chromaticity but, because of variations in luminosity resulting from three-dimensional modeling of highlights and shadows, the values of chromaticity or a function of luminance or density may vary over a 20:1 ratio. Traditional methods of color detection would select certain color values of the shirt within the photograph but would miss others. Hence, it is customary in the graphic arts industry to employ expensive and time-consuming correction masks, or to hand etch various localized areas of the color-separation negatives, when color-retouching is required.

The present invention is also equally applicable to color generation. U.S. Pat. No. 4,183,046 to George W. Dalke, one of the co-inventors of the present application, and Michael D. Buchanan, which issued on Jan. 8, 1980, discloses a color generation system using digital techniques wherein intensity, hue and saturation can be varied independently, as desired.

The present invention, when combined with a color graphics system, enables the operator to independently vary luminance and color with respect to any given part of the image. This enables an artist to modify or create color in a truly electronic sense, and bypasses the requirement that the graphic image first be created in a tangible medium and then be reimaged with a video camera or the like.

SUMMARY OF THE INVENTION

The present invention provides new and novel improvements in color detection or recognition systems; in color modification and insertion systems; and, in color creation and graphic creation systems.

In the color detection or recognition mode, the present invention digitizes color information to create a three-dimensional color sub-space that is defined within a three-dimensional color universe. By evaluating and storing chromaticity values for an object as a function of luminance, a curve is formed through the three-dimensional color space. By evaluating the spread of chromaticity values (i.e., the range of hue and saturation at each level of luminance), and generating a weighting signal, therefore, a three-dimensional color sub-space may be calculated and stored for future evaluation or modification. This three-dimensional color sub-space then provides a color signature against which all future colors may be compared. By digitizing the incoming color signals, they may be quickly compared on a point-by-point basis with the three-dimensional sub-space. If the coordinate values assigned to the incoming color point fall within the sub-space, they are recognized as representing the same color. If the coordinate values of the color lie outside the defined color sub-space, they are rejected as being representative of a different color. In addition, the weighting signal may be generated so that it decreases rapidly for those colors near the boundary of the color sub-space. This enables the system to make a smooth transition when color modification or insertion is desired.

It is also an object of the present invention to provide a unique means for modifying portions of a color image by digitizing the image and identifying the particular color to be modified according to the aforementioned three-dimensional color sub-space. The digitized image is then scanned on a point-by-point basis and the coordinate values at each point are compared with the data for the color sub-space. If the coordinate values of the color point fall within the three-dimensional color sub-space, they are routed to the appropriate color modification circuitry. If the coordinate values of the color point fall outside the three-dimensional color sub-space, they are routed on for normal, umodified display. Thus, it is possible to identify an item by its color signature and to change or retouch the color of that item over the entire luminance range. The color modification circuitry of the present invention also provides for independent modification of chromaticity and luminance for each defined sub-area within the image.

It is also an object of the present invention to enable the operator to make color corrections to desired objects on a real time basis. Thus, the flesh tones of an individual or the shading of a pair of Cordovan shoes may be adjusted by the operator, while viewing a high resolution color monitor, until a desired color balance is reached. A unique high-speed digital processing technique enables the operator to make these adjustments in real time when viewing an image comprised of over one million pixels, wherein each pixel could represent over sixteen million different combinations of color values. The processing array uses pattern recognition techniques to simultaneously process the three coordinate values at the same time, and provides a completed calculation for each pixel in under 20 nanoseconds.

In addition to the color processor, the invention uses a store and refresh system for the image to provide the three coordinate values for each pixel simultaneously. This is accomplished by providing three separate memory planes, each with a 1024×1024 array of pixel values. Each of the memory planes stores an eight-bit word for each pixel. Each eight-bit word is capable of signifying 256 values and it is therefore possible for the system to store 256 values of luminance, and 256 values of each of two chromaticity values.

It is a further object of the present invention to provide a unique high-speed digital processing technique that may be used in software, firmware, or specially constructed digital or analog processors.

PRIOR ART STATEMENT

I. Color Detection

U.S. Pat. No. 4,110,826 which issued to Mollgaard et al, on Aug. 29, 1978, describes a methodical means of color detection that creates a three-dimensional color model by converting RGB to xyz, wherein z becomes an approximation of luminance after z coordinate transforms. Mollgaard et al then uses additional transforms to alter the shape of the sub-space circuit.

Applicant's invention, on the other hand, defines every possible nuance of curvature in constructing its three-dimensional model. Each incoming pixel is evaluated against the model. It is possible for the $x_o, y_o$ coordinates to vary or change over each of 255 different levels of luminance. Mollgaard et al teaches the straightening of the luminance curve, while applicants seek to preserve its integrity.

Further, Mollgaard does not generate a weighting function which declines smoothly to zero for the smooth insertion of modified color since they are not concerned with modifying color, but only with detecting it.

U.S. Pat. No. 4,060,829 and 4,127,871 to Tarashi Sakamoto also disclose the concept of color as a three-dimensional shape, but limit the shape to a single cube. Sakamoto then defines printable color as barrel-shaped, and provides three density signals, $D_R$, $D_B$ and $D_G$ for evaluating the associated color correction signals. Sakamoto stores only his correction signals in memory, while applicants store all values in memory. This is possible because Sakamoto is only concerned with color correction values necessary to modify color separation negatives to known properties of printing inks. Applicants use a totally different approach to determine which colors to modify and how to modify these. Furthermore, Sakamoto does not disclose any detection circuitry.

II. Color Modification for Portions of an Image

U.S. Pat. No. 4,258,385 to Greenberg et al, issued on Mar. 24, 1981, discloses an interactive editing system for video production. The video signals are broken into RGB memory planes, and may be altered on a pixel-by-pixel basis by the generation of a physical or electronic mask. The area within the mask may then be altered and then recombined with the original image. The electronic mask is generated on the x,y physical axis of the image by a track ball, digitizing table, or a keyboard. The physical mask is scanned by a camera and converted to an electronic mask.

There is no teaching in this reference that a color may be defined as a three-dimensional color sub-space, or that physical articles may be recognized by their color signatures. The reference does not use a color detector, and does not disclose or teach how color is to be combined, except by specifying a commercially available "Comtal Vision ONE/20 Image Processor."

Other reference of interest in this area are: U.S. Pat. Nos. 4,189,743 and 4,189,744 which alter color within image areas defined by a digitizing tablet or the like.

U.S. Pat. No. 3,965,289 and 3,894,178 to Peter Pugsley, one of the co-inventors of the present application, also disclose means for altering a localized area in an image by painting a mask on the image to be scanned and retouched. It should be noted that the U.S. Pat. No. 3,965,289 patent, in particular, teaches the conversion of RGB to luminance x and y for partial image modification.

U.S. Pat. No. 3,848,856 discloses a system using analog circuits to alter color within an electronically-defined physical x,y axis area. U.S. Pat. No. 3,772,465 likewise defines a sub-area on a physical x,y axis for digital modification.

U.S. Pat. Nos. 2,790,844 and 2,799,722 also disclose analog methods of making localized color corrections within an image by using physical masks.

U.S. Pat. No. 3,784,736 teaches the coloring of localized areas of a T.V. image by defining the physical x,y area to be colored with a "sonic pen," and adding color.

As indicated above, U.S. Pat. No. 3,965,289 to Peter Pugsley, one of the co-inventors of this application, teaches the modification of color areas within an image and, in processing the image, converts RGB to l,x,y.

U.S. Pat. Nos. 4,007,327 and 4,220,965 also separate the luminance portion of the signal from the chrominance or chromaticity component for image processing.

Of general interest in the field of color modification, three patents assigned to Crosfield Electronics, two of which name Peter Pugsley, one of the present co-inventors, as either the inventor or co-inventor. These three references are U.S. Pat. Nos. 3,600,505, 3,739,078 and 3,893,166. These references are an indication of the present state of the art in color modification.

DETAILED DESCRIPTION OF DRAWINGS

FIGS. 4B and 4C are diagrammatic representations of an extrapolated single color curve derived from sample points s1 thru s4. FIG. 4B illustrates the trajectory along the x or $C_2$ axis, and FIG. 4C illustrates the trajectory along the y or $C_3$ axis.

DETAILED DESCRIPTION OF THE PREFERRED EMBODIMENT

Figure 1:
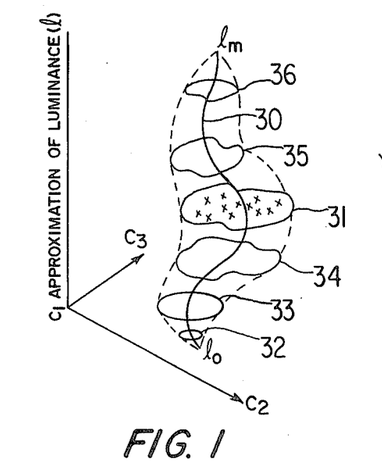
FIG. 1 is a diagrammatic view of a three-dimensional color sub-space defined within a color universe, wherein the color universe is defined by three axes, $C_1$, $C_2$ and $C_3$, the $C_1$ axis being luminance, and the $C_2$ and $C_3$ axes representing chromaticity.

As illustrated in FIG. 1, a three-dimensional color sub-space is defined by three axes: $C_1$, $C_2$ and $C_3$. The first coordinate, $C_1$ or l, represents approximations of luminance; the second and third coordinates $C_1$ and $C_2$ or x,y, vary predominantly with chrominance or chromaticity or may represent an arbitrary plane in tristimulus color space.

Several usable coordinate systems for color space have previously been defined. The Commission Internationale de L'Eclairage (C.I.E.) has defined tristimulus color on l,x,y axes wherein l represents luminance, and x,y represent two orthogonal chromaticity coordinates. It should be noted that while l, x and y have been used in some areas of the description of the preferred embodiment, it is not intended that these parameters necessarily be identified to the C.I.E. coordinates. The C.I.E. has also defined color space in terms of l,u,v axes which could be used in the present invention if uniform color shifts for equal intervals are desired. Another well known coordinate system that could be used is the television I,Y,Q coordinates. In the graphic arts industry, where shits from RGB to CYMK (K representing black) are frequent and necessary, it is possible to approximate $C_1$, $C_2$ and $C_3$ or l,x,y as folows:

$$C_1 = l = \frac{R + G}{2} \qquad C_1 = l = \frac{C + M + K}{3}$$

$$C_2 = x = R - G \qquad C_2 = x = C - M$$

$$C_3 = y = B - l \qquad C_3 = y = Y - \frac{C + M}{2}$$

Figure 4A:
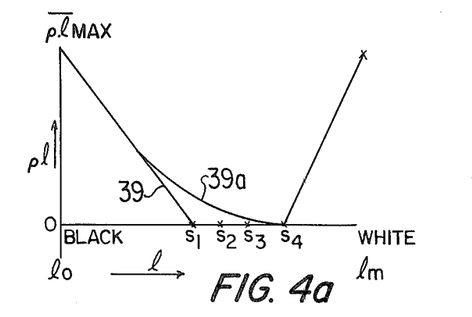
FIG. 4A is a diagrammatic representation of a luminance factor signal generated to include values of luminance lying outside the luminance values of sample points s1, s2, s3 and s4.

The selection of color coordinate axes may be altered substantially, provided the three axes span color space, i.e. that no two coordinate axes are parallel. FIG. 4D represents an illustration of the effect of shifting the $C_1$ or l axis from the luminance axis. l' has been shifted approximately 20 deg. from l in FIG. 4D. The effect of this shift is noted on the defined color curve 30a and color sub-space 31a. As l' is shifted, the slices through the color space become diagonal with respect to the longitudinal path of color curve 30a.

If it is desired to detect a specific color reflected from a specific surface, the $C_1$ axis (l) may be aligned with that color curve to assist in maximizing the variations of luminance for that color and surface.

Figure 2:
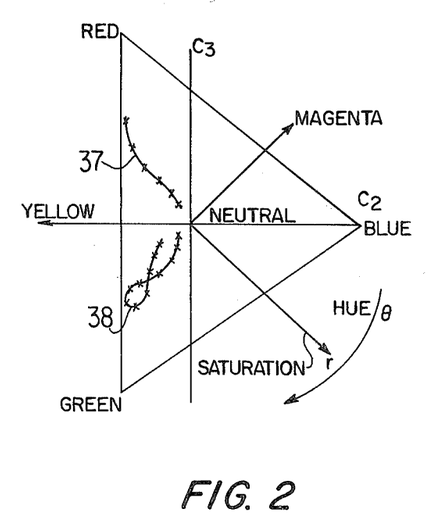
FIG. 2 is a graphic representation of a color triangle and two sample curves of chromaticity values that have varied as a function of luminance.

In the preferred embodiment the $C_1$, $C_2$ and $C_3$ axes are as illustrated in FIGS. 1 and 2. $C_2$ and $C_3$ are Cartesian chromaticity coordinates that overlie a mathematically derived version of "Maxwell's Triangle," wherein the origin of the luminance axis is at neutral white, the $C_2$ coordinate is aligned along the blue-yellow direction and the $C_3$ coordinate is aligned along the red-green direction. The angle of rotation around the origin represents hue, while the radius from the origin represents saturation.

Figure 6:
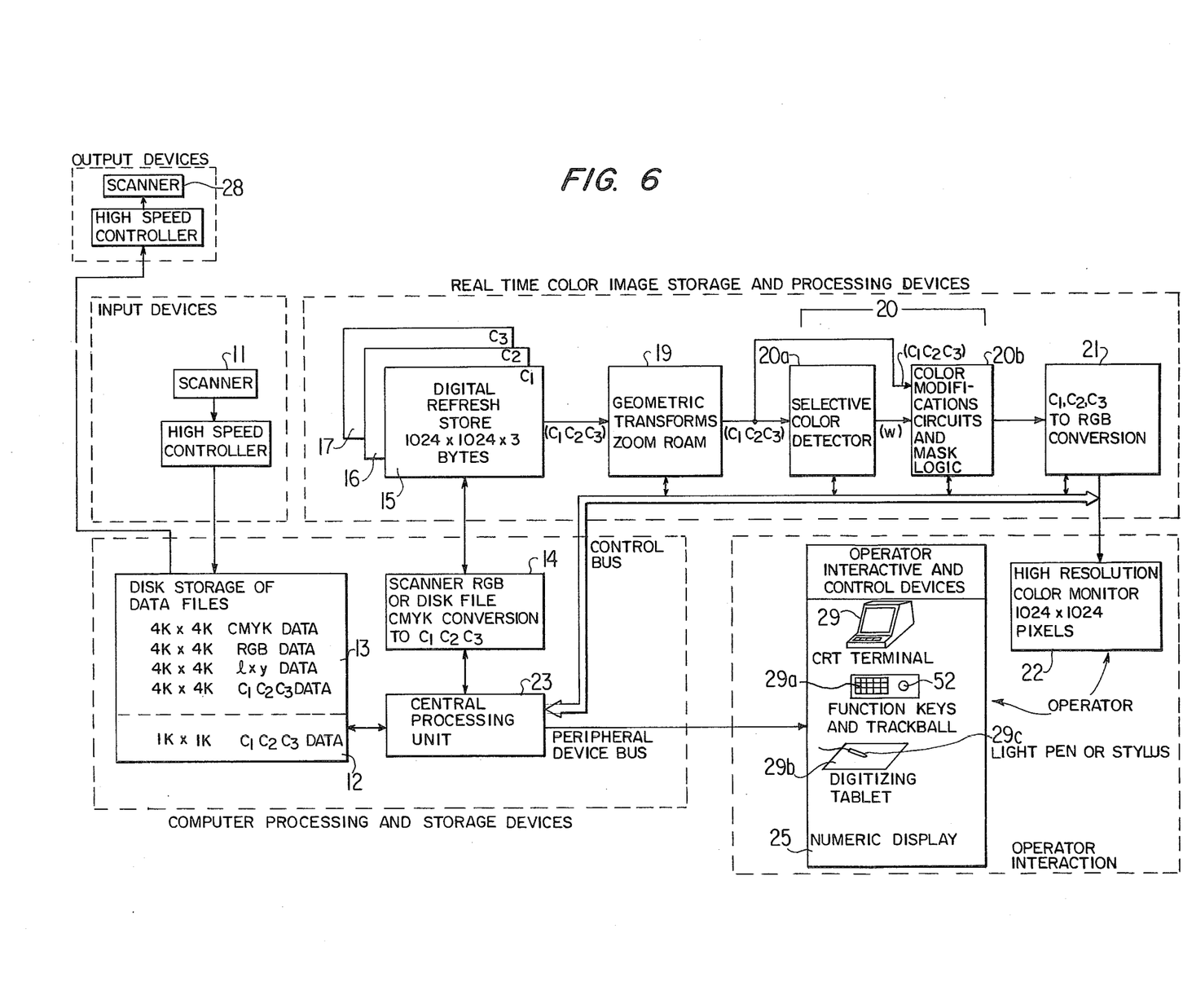
FIG. 6 is a block diagram illustration of a data processing array containing the present invention that is particularly adapted for the evaluation and modification of color images on a high-resolution color monitor.

One system utilizing the present invention is illustrated in FIG. 6, where the data processing array would be particularly suited to graphic arts applications wherein images are combined, modified, retouched or manipulated. It would also be particularly applicable to the evaluation of images obtained from aerial reconnaissance for agricultural, geological or other interpretive assessments.

A scanner 11 is used to scan a colored original on a point-by-point basis and produces digital video signals for storage in several files simultaneously. One or more discs 12,13 are used to store files arrayed on a pixel-by-pixel basis, with the first file 12 being a low resolution file which maintains the image in a 1024×1024 pixel array. Separate high resolution files 13 are provided to maintain 4096×4096 pixel resolutions arrayed with CYMK, RGB, $C_1$, $C_2$, $C_3$ and l,x,y values in each file. These files are particularly useful in the graphic arts industry. The high resolution files are used because it is desired to obtain the 4096×4096 pixel resolution in the production of color separation negatives. Because 4096×4096, pixel resolution color monitors are not currently commercially available, the lower resolution disc file is also required. Conversion circuit 14 transforms the signal values obtained from the point-to-point scanning to the $C_1$, $C_2$, $C_3$ or the l,x,y coordinates desired for use in color detection or modification. As was mentioned previously, the $C_1$ coordinate represents the luminance or brightness of each image point in the scan, while the $C_2$, $C_3$ coordinates represent the chromaticity or chrominance values of each point scanned.

Each pixel carried in the lower resolution file is evaluated by transform circuitry 14 with the $C_1$ value stored in memory plane 15, the $C_2$ value stored in memory plane 16, and the $C_3$ value stored in memory plane 17. As illustrated in FIG. 6, these memory planes correspond to a refresh store having a 1024×1024 pixel array that is used to drive the high resolution color monitor 22.

The data processing array illustrated in FIG. 6 further includes a geometric transform circuit 19 which enables the operator to select arbitrary portions of the image for evaluation or modification. If the operator has selected a portion of a larger image circuit 19 in conjunction with data input from data files 13, will enable him to roam over the entire global image. The global image is defined as the entire displayed image scanned by scanner 11. The color detection and modification circuitry is contained in the selective color processor 20a and 20b and will be described in detail with respect to FIG. 7.

The second conversion circuit 21 is provided to convert the $C_1$, $C_2$, $C_3$ coordinate system to the RGB signals needed by the color television monitor 22. A central processing unit or "main frame" computer 23 provides several well-known data processing techniques used in the present invention. It should be pointed out that the selective color processor 20 may be formed entirely of software, of firmware, or of specially constructed digital or analog hardware. A mask logic circuit in the color processor 20b is provided to assist the operator in the detection, evaluation and modification of the image as will be hereinafter described in detail.

After the desired color selection and modification has been performed by the operator by means of the real time storage means 15-17 and the color processing means 20a and 20b, it is necessary to apply the same detection and modifications to a large 4k×4k data file located on the disk storage device. This is accomplished in one of two ways:

1. The 4k×4k image is divided into 16 1k×1k sub-images that are processed sequentially by the real time system, or
2. The computer uses a software algorithm to perform the calculations directly on the disk data files 13.

After one or more modified color images are stored on the disk, they may be transferred to YMCK color coordinates and outputted as color separations by a scanning film printer 28.

If the system were generating and modifying color separation negatives for the graphic arts industry, the output command circuit would operate an exposing head on scanner 28 to expose the color separation negative after the desired image had been combined, retouched or created. If the system illustrated in FIG. 6 were being used for the evaluation of aerial reconnaissance images, the output command might well be a mathematical integration of the areas identified by the selective color processor 20.

In the embodiment illustrated in FIG. 6, the steps taken by the operator may be summarized as follows:

a. First, an image to be evaluated or modified is scanned by scanner 11, with the pixel value stored in disk files 12 and 13;

b. secondly, values representing a sample color are generated or retrieved. If the sample color is of a known or previously determined value, the selective color processor is loaded with the coordinate values that define the sample color curve 30, illustrated in FIG. 1. If the values for the sample color are not known, they are obtained by moving a cursor over the desired color as displayed on color monitor 22. If the color is reflected color from a textured or modeled surface, several samples are taken from highlight, midtone and shadow areas;

c. the CPU then loads the sample values into the selective color processor 20a, 20b in a manner which will be hereinafter described;

d. the operator may then visually check the accuracy of the sample by causing the color processor to superimpose a highlight mask over each pixel having the sampled color. If the operator is not satisfied with the accuracy of the sample, he may take a new set of samples, add new samples to those processed previously, or he may change the "weighting" function, as will be hereinafter explained.

e. Once the operator is satisfied with the identification of the color sample, he proceeds to the next step of color modification or evaluation.

f. In modifying the color, the operator adjusts track ball 52 on control means 29a, to add or subtract various amounts to the $C_1$, $C_2$ or $C_3$ values, all three are independently variable. As the desired modification is made, the computer automatically stores the modified color values.

g. If a second color modification is desired in the original image, the operator begins by sampling the desired color and continues by proceeding as described above. Once all of the modifications or retouching steps have been completed, and the modified color values stored, the operator instructs the CPU to modify the values stored in the 4096×4096 pixel memory files 13.

h. If the operator desires to evaluate the color, he may obtain a numeric readout from CRT 29, or he may instruct the CPU to integrate the area of all pixels having that color value to a quantifiable value with respect to the original image. This would provide the operator performing an agricultural evaluation of an aerial image, with the number of acres affected by drought, blight or the like.

The input to the system may take several forms. A color may be modeled or created from the control panel 29a and a numerical display on CRT 29 in terms of a known mathematical description. A color may be retrieved as a "standard" color from a previously developed library of color values. A cursor, displayed on monitor 22, may be moved by control panel 29a, or track ball 52, to a designated location. In the latter mode, the cursor samples not one pixel, but a number of pixels, whose values are evaluated and scaled as illustrated in FIG. 1. For example, if it were desired to determine the percentage of blighted wheat in an aerial photograph, the cursor would be placed on the image of an area known to be blighted and a sample would be taken at that point. Preferably, a small group of pixels, centered at the desired point, for example 10×10 pixels, is extracted and the $C_1$, $C_2$, $C_3$ values averaged. This minimizes the chance of malfunction due to sampling an isolated defective pixel or due to noise or grain in the image.

The sample points may also have been derived by placing a light pen or stylus 29c to a particular point on a display picture, or the original transparency superimposed on digitizing tablet 29b, or by presenting the computer with a series of samples, or a single known sample, representing colors from which detection and modification is desired. Similarly, if the operator were preparing graphic arts separation negatives, and one of the color transparencies displayed a pair of Cordovan shoes of the wrong shade, the operator would then touch the light pen or cursor to the image of the pair of shoes. Each sample of the wheat or shoes would be in the form of 10×10 pixels or other size set by the computer appropriate to the scale of the image, size of the object and statistical distribution of the sampled data. In the preferred embodiment, the operator would take a highlight sample, a shadow sample and two or three mid-range samples to provide four or five hundred various pixels, each of which might vary with respect to its luminance, hue and saturation.

The generation of the three-dimensional color subspace will now be described with respect to FIGS. 1, 5, 6 and 7. From an evaluation of all pixel points sampled, the central processing unit 23 determines the point of maximum luminance, indicated by lm, and the point of minimum luminance, indicated by lo. These values are then entered into a lookup table to define the initial end points of the curve 30. The remaining sample values are then processed in turn to enable the specific value of each l,x,y, point to be written into lookup tables, T1, T2 and T3 in FIG. 7. x and y values are defined in T2 and T3 as functions of luminance values l. As was previously indicated, each of the pixel values is assigned an eight-bit word, providing 255 possible variations of luminance and 255 values in each of the x and y axes. As illustrated in FIG. 1, one luminous plane indicated by numeral 31 has, therein, a plurality of pixel point coordinate values surrounding the curve 30. FIG. 1 illustrates six density planes, 32-36, for purposes of illustration only. As indicated in the preferred embodiment, there are 255 separate density planes available for the samples derived from the light pen or cursor.

Figure 5:
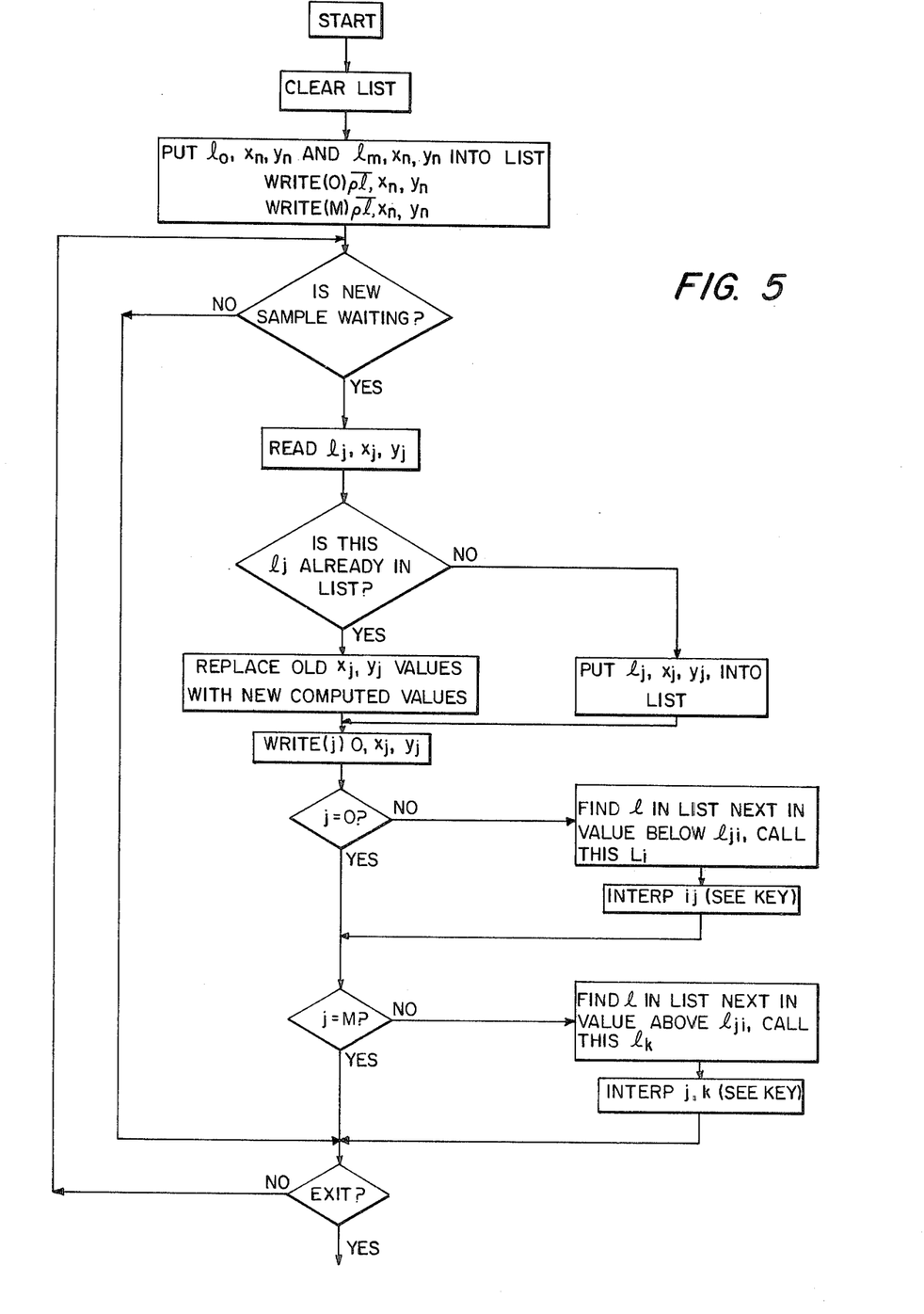
FIG. 5 is a flow chart that illustrates one method of ordering the luminous curve for a given three-dimensional sub-space.

Each new set of pixel values is processed as illustrated in FIG. 5. First, it is determined if that value of luminance is already in the list. If the value is listed, a computation is made to average the x and y coordinate values of the new pixel sample with any previous x and y values in order to derive a new computed x and y value. This computation will be further explained with respect to FIG. 3. If the luminous sample lj (in FIG. 5) is not in the list, then lj is listed in order between lm and lo. lm and lo represent the greatest and least values of l that can be handled by the system. The central processing unit then places the xj,yj values in order in the lookup tables T2-T3 in the manner illustrated in FIG. 5.

The INTERP sub-routine for listing the various luminous samples is defined as follows:

$INTERP\,(p,q)$

IF $p + 1 = q$ RETURN, OTHERWISE

FOR $r = (p + 1),(p + 2) \cdot (q - 1)$

WRITE $(r)\;pl = plq \frac{(q - r)}{(q - p)} + plq \frac{(r - p)}{(q - p)}$ $x = xp \frac{(q - r)}{(q - p)} + xq \frac{(r - p)}{(q - p)}$ $y = yp \frac{(q - r)}{(q - p)} + yq \frac{(r - p)}{(q - p)}$

RETURN

With respect to FIG. 5, the term "LIST" refers to an unordered list of sample data lj, xj, yj held in control processor memory. The term WRITE(j) refers to a command to write the specified values of pl, x, y into the addresses of T1, T2 and T3, respectively. (T1, T2, T3 each contain one address for each of the 0, 1, 2 ... M possible quantising levels of l). pl, $x_n$,$y_n$ define standard lookup table entries at addresses o and m defining curve end points. These entries are modified only when a sample is read with l=lo or l=lm, respectively.

The ordering of the values lj may also be done by any other interpolation routine which provides for an ordered array of luminance values beginning with least luminance and ending with maximum luminance. After all sample values have been entered into the lookup tables, the color curve 30 of FIG. 1 may be ascertained. It is also desirable to interpolate values of pl between sample points of l, and to extrapolate values of pl beyond sample points of l as will be described with respect to FIG. 4A. The derivation of the x,y Loci for curve 30 through each density plane may be done by any known statistical averaging technique.

Figure 3:
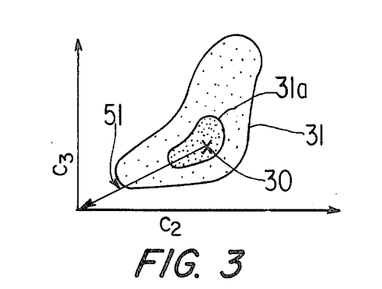
FIG. 3 is a diagrammatic representation of a single plane along the $C_2,C_3$ axes of the three-dimensional color figure illustrated in FIG. 1.

As illustrated in FIG. 3, a single luminance plane has defined therein a plurality of pixel $C_2$, $C_3$ or x,y coordinate values. The location $x_o$,$y_o$ and shape and extent of the distribution of color curve 30 may be defined by several known statistical techniques including, but not limited to, averaging; standard deviation; centroid mean value; or least squares regression. Complex distributions of sampled data indicated by 31 and 31a may also be considered in determining the location of the locus for curve 30 within any given luminance plane. The variations or perturbations of color curve 30 arise as the effects of the distribution are included in the calculation of the curve parameters.

In lookup Table T2, a single x value exists for each value of luminance along the color curve. In Table 3, a single y value exists for each luminance value. These x,y values, as a function of luminance, define the color curve 30 illustrated in FIG. 1. This color curve is frequently convoluted as it proceeds from minimum to maximum luminance.

FIG. 2 described two curves that are diagrammatic representations of a typical flesh tone curve 37, and of a green curve 38 derived from sampling a photograph of a green hairdryer. While technically the hue of the green hairdryer was constant at any given point on its surface, its reflected light varied in hue and saturation as a function of its luminosity. Similar changes were noted in the flesh tone trajectory 37.

Figure 4B:
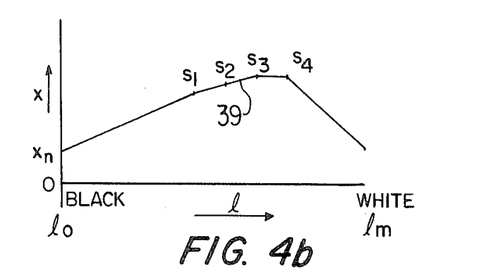
Figure 4C:
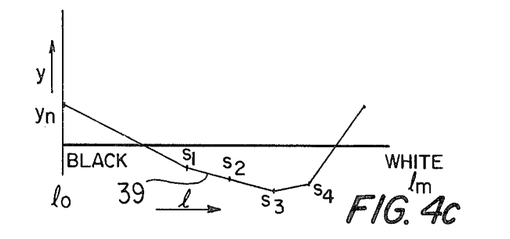
Figure 4D:
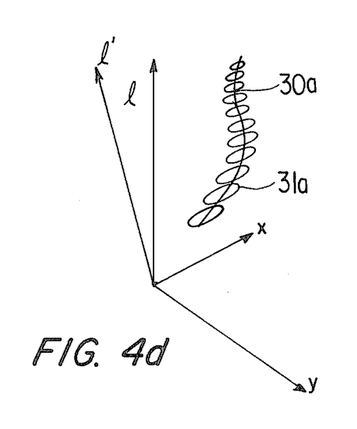
FIG. 4D is a diagrammatic representation of a three-dimensional color sub-space defined within a color universe wherein the $C_1$ axis, denoted by l', is tilted from the luminance axis l.

FIGS. 4B and 4C represent another color trajectory 39 derived from four sample points S1 thru S4. The method of writing and extrapolating the color curve 39 previously described with respect to FIG. 5 is illustrated with four sample points, S1 thru S4, having been taken and four luminance values having been derived, together with four values for each of the x and y coordinates. FIG. 4A illustrates the generation of the luminous factor signal pl through extrapolation. The computer extrapolates luminance values outside the sample range, preferably by linear interpolation between predetermined values at each end of the trajectory. The curve construction illustrated in FIGS. 4A thru 4C produces the following result:

a. Within the luminance range of the sample, $x_o, y_o$ have values for which maximum detection and modification is required and the value of pl in lookup Table T1 is 0.

b. Outside the luminance range of the sample, $x_o, y_o$ depart slowly from the values over which maximum detection or modification is required, while pl rises rapidly towards a limit value of $\overline{pl}$ max. The value of $\overline{pl}$ max is chosen to be comparable with the maximum values of $\delta x, \delta y$ in the coordinate system used. It will be appreciated, then, that pl represents luminous deviation from outside the luminance values for which maximum correction is required, and that $x_o, y_o$ represent chromaticity values at which maximum correction is required.

Once the color curve 30 is defined in lookup tables T2-T3, a coordinate transform is done to shift the curve 30 into coincidence with the l axis. This transform is illustrated by arrow 51 in FIG. 3. The purpose of the transform is to simplify the calculations necessary when incoming signal coordinates are evaluated with respect to the three-dimensional model.

The transform is carried out on the actual values of l,x,y at each pixel within the image in the following manner:

At each pixel the actual values of x,y are compared by adding circuits 40 and 41 with those generated by Tables T2,T3 representing the corresponding point on the stored three-dimensional color curve 30 described above. The differences are $\delta x, \delta y$.

$$\delta x = x - x_o$$

$$\delta y = y - y_o$$

Clearly, for a pixel having the values of x,y expected from this curve, $$\delta x = 0$$

$$\delta y = 0$$

and $\delta x, \delta y$ form a measure of the departure of the actual values at the pixel from the values expected at the corresponding value of l.

Similarly, from the shape of the curve in Table 1

$$pl = 0$$

when l is within expected range and pl forms a measure of the departure of l from the expected range; and pl,lx,ly are used to generate the weighting value mentioned previously.

Figure 7:
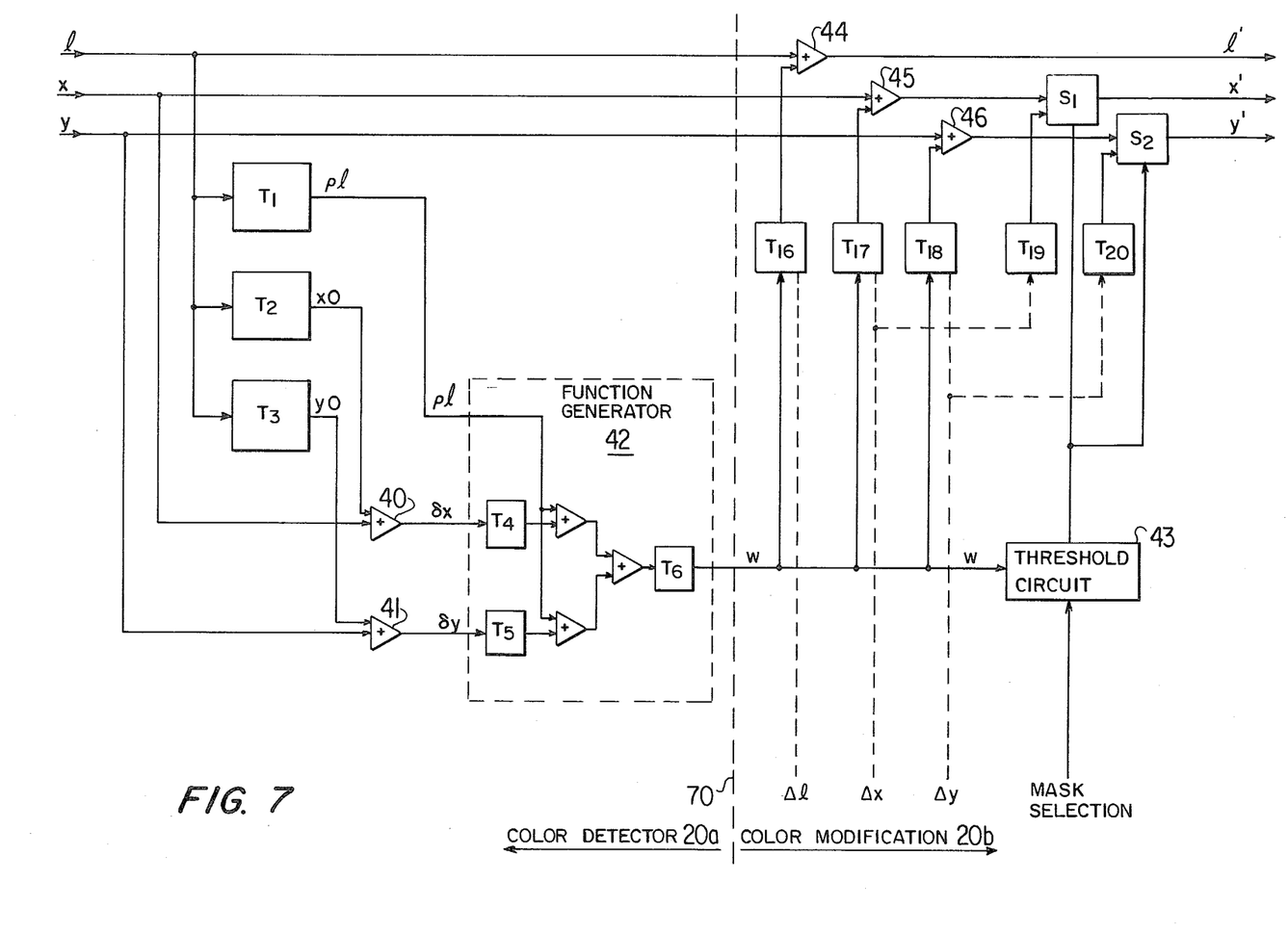
FIG. 7 is a block diagram of the color detection and modification circuits used in the selective color processor illustrated in FIG. 6.

The weighting value w is generated in function generator 42, illustrated in FIG. 7. It defines a three-dimensional color sub-space around the color curve 30, and assigns a value to each pixel which varies as a function of the pixel's distance from the color curve 30. When the pixel coordinates are coincident with the curve, the weighting function is at its maximum value, and it declines as the coordinates of the pixel approach the outer limits of color sub-space 31, as illustrated in FIG. 3.

The various ways of generating the weighting function will be discussed in detail with respect to FIG. 7. The purpose of the weighting funtion is to provide modification values, w, which decline smoothly as the color sampled departs from the preferred sample value indicated by the color curve 30. The rate of decline may be modified by modifying the table values in the function generator to provide smooth insertion of color, or sharply-defined insertion of color, as desired. This enables the system to be set up so as to follow the natural variations of hue and saturation that occur due to the effects of lighting, shadows and reflections in the picture of an object that in reality has a uniform hue. If desired, the weighting function may be altered above and below certain luminance values so that, for example, the darker and mid-tone flesh tones in a picture may be lightened without affecting the lighter flesh tones, and without introducing color discontinuities. This type of modification may be carried out, for example, by changing the curve in T1 (FIG. 4a) from curve 39 to a curve such as that shown as 39a.

The selective color processor illustrated in FIG. 7 has two distinct functions, indicated by 20a and 20b on either side of dotted line 70. The first function, in the detection circuits 20a, is to identify the colors to be corrected, and the second function, in the modification circuits 20b, is to apply the correction. As discussed previously, the color to be corrected is described by the color curve defined in lookup Tables T1-T3. A coordinate transform may be performed, as illustrated by the arrow 51 in FIG. 3, to transfer curve 30 into coincidence with the l axis. This is performed in adding circuits 40,41 and is used to simplify the calculations needed to determine whether a given coordinate value lies within or outside the predefined color subspace. It should be noted that the coordinate transform thus varies at each level of luminance to preserve the integrity of the color curve 30 illustrated in FIG. 1.

The function generator 42 illustrated in FIG. 7 is responsible for generating the weighting function previously discussed. The weighting function may be represented as follows:

$$w = T_6[T_1(l) + T_4(\delta x) + T_5(\delta y)]$$

wherein; $\delta x = x - T_2(l)$; $\delta y = y - T_3(l)$; and $T_1(l) = pl$ as previously described, or some convient function of pl. T4 and T5 may be log tables, while T6 is an exponential table. The output of the function generator is the weighting function w which is used to determine how much color variation or modification is applied to a given pixel. T1 stores the luminance factor values described with respect to FIG. 4A. The tables may be loaded to produce a variety of surface effects, provided that:

$$w = 1 \text{ if } pl = 0 \text{ and } \delta x = \delta y = 0$$

$$w = 0 \text{ if } pl \text{ or } \delta x \text{ or } \delta y \text{ are sufficiently large.}$$

It should be pointed out that function generator 42 may be constructed in a variety of ways other than the circuit shown in FIG. 7. Other circuits could be used to provide a variety of mathematical processes to generate w. For example, the following suitable functions may be used as alternate embodiments in the invention:

a. $w = \exp[-S(pl^2 + \delta x^2 + \delta y^2)]$

This is a Gaussian function in three dimensions whose value is 1 when $pl = \delta x = \delta y = 0$, and declines asymptotically to zero when any or all of pl, $\delta x$, $\delta y$ become numerically large. The rate of decline depends upon S. This function is operationally satisfactory but is difficult to generate economically since a chain of operations is involved, namely square, add, multiply and exponential. Further, in some applications its asymptotic approach to zero may be undesirable and truncation may be required.

b. $w = 1 - S$ [largest of (pl), ($\delta x$), ($\delta y$)] is positive, else $w = 0$. This is the four-dimensional equivalent of a square-based pyramid whose height is 1 and base side 2/S. w declines uniformly from a peak of 1, reaching zero when $$pl = 1/S, (\delta x) = 1/\delta \text{ or } (\delta y) = 1/S$$

This function is much simpler to generate but is rather less satisfactory in practice due to the absence of any flat area around the apex.

c. $P = K - S$ (largest of (pl), ($\delta x$), ($\delta y$)
where K is a constant $\geq 1$
then $w = 1$ if $P \geq 1$ else $w = P$ if $P \geq 0$ else $w = 0$ This generates a truncated pyramid of height 1, but is otherwise similar to (b). The degree of truncation depends upon K; at K = 1 there is no truncation and the result is identical to (b), above. This function is fairly simple to generate and is satisfactory in practice. Other variations of w are possible, the general form being:

$$w = F_L(pl) \times F_C(\delta x) \times F_C(\delta y)$$

in which $F_L, F_C$ (not necessarily identical) are functions of the forms $$F(O) = 1$$

and $0 \leq F(x) \leq F(O)$ for values of $x > 0$, with $F(x)$ declining smoothly and monotonically as (x) increases.

Function generator 42 (FIG. 7) may also include additional lookup tables that are used to alter the scale factors of $\delta x$ and $\delta y$ as they are entered in generator 42. Provision can then be made in the control software to generate a predetermined spread signal by rescaling pl so that the rate of falloff of the weighting function in different directions in color space may be separately controlled, as desired. In addition, this spread signal may be calculated as a function of luminance, and applied to the weighting signal at each value of luminance.

Once the operator has selected the color to be detected or modified, and chosen the appropriate tables values for function generator 42, the entire image area is scanned on a pixel-by-pixel basis with the l, x and y values from each image point applied in succession to the color detection circuitry illustrated in FIG. 7. At each point, the actual values of x and y are compared with those generated by the lookup Tables T2,T3 representing the corresponding point on the stored three-dimensional color sub-space previously described. The differences are $\delta x = x - x_0$ and $\delta y = y - y_0$. Clearly for a point having the values of x,y expected from this curve, $\delta x = 0$ and $\delta y = 0$ and $\delta x \delta y$ form a measure of the departure for the actual values at that point from the values expected at the corresponding values of luminance. Similarly, from the shape of the curve in lookup Table T1, pl = 0 when l is within the expected range and forms a measure of the departure of l from the expected range. $\delta x, \delta y$ and pl are then used by function generator 42 to compute w in the manner previously described. The output of the function generator will be 0 for all pixels whose l,x,y values lie outside the predefined color subspace illustrated in FIG. 1. For those pixels having coordinate values identified as being within the three-dimensional color sub-space, w will rise to a value of 1.

The color modification is accomplished by the color modification circuit 20b as illustrated in FIG. 7 by applying the weighting function w to a second set of lookup Tables T16, T17 and T18, together with operator selected values $\Delta l$, $\Delta x$ and $\Delta y$. $\Delta l$, $\Delta x$ and $\Delta y$ are entered into the lookup Tables T16, T17 and T18 by the computer, with the values of the tables being varied by the operator by means of track ball 52 on control panel 29a. Alternately, Tables T16, T17 and T18 could be replaced by simple function circuits which provide proportional values of $\Delta l$, $\Delta x$ and $\Delta y$ to the adding circuits 44–46.

Regardless of the circuit used, w is applied to incoming l, x and y as follows:

$$l' = l + w\Delta l$$

$$x' = x + w\Delta x$$

$$y' = y + w\Delta y$$

Δl, Δx and Δy are quantities under the control of the operator and represent the greatest amount of modification of l, x, y that will be applied anywhere in the picture.

The output signals l', x' and y' may then be routed to the color monitor 22 for evaluation or, if satisfactory, to the refresh and store memories 15-17, if additional modifications to the image are desired.

A mask logic circuit is also provided to assist the operator in evaluating the color detection sub-system. This circuit may also be used for sharply-defined color insertion, for color replacement, or color deletion.

In operation, the output of function generator 42 and threshold circuit 43 is used to generate a mask to enable the operator to determine if, in fact, the color selection circuit has correctly identified all of the objects having the targeted color. In the agricultural and graphic arts illustrations previously used, a mask would be automatically superimposed over all of the areas on the color monitor display having the same color value as the pixels selected during the sampling process. This mask, generated by threshold circuit 43, activates switch S1 and switch S2 (in FIG. 7) to insert arbitrary values of x and y, from lookup Tables T19 and T20, on each of the pixels identified by the threshold circuit. Threshold circuit 43 is triggered when the value of w rises above a certain predetermined value. By altering the values in lookup Tables T19,T20 the mask may be made to assume any color desired. The values loaded in T19 and T20 may also be varied by the operator, if desired. This mask feature may also be used for hard edge insertion of a replacement color for each pixel identified by the detection circuit. Once the operator has determined through the masking operation that the circuitry has indeed identified all areas of targeted color, he or she may then select the values of Δl, Δx and Δy desired to retouch or modify the image.

In the graphic arts example, the operator may desire to shift the hue of the Cordovan shoes, or to vary the luminosity, or both. This operation may be done in real time inasmuch as all values l, x and y for each pixel are processed simultaneously. After all adjustments have been made, the values are transferred back to the central processing unit which is used to process the original stored data in the high resolution disk files 13 and to process the high resolution color values with the modifications generated by the selective color processor illustrated in FIG. 7. In this manner, the operator is able to adjust the appearance of the display image using automatic selective color correction, and subsequently to obtain color separations or plates from the output scanner 28 in which the images incorporate results identical to the adjustments made to the color monitor image.

If desired, additional circuitry may be incorporated in the data processing unit illustrated in FIG. 6, to enable the operator to identify certain areas by their physical coordinates using a cursor, and a light pen or stylus 29. For example, if a catalog photograph contained two faces, one of which was undesirably shadowed, the operator would select the flesh tone in a manner previously described. The mask generation circuit would then superimpose a mask over both faces on color monitor 22. By using light pen or stylus 29 or the cursor 29b on the physical coordinates of the image on the color monitor, the operator could then instruct the CPU to disregard all w functions except those within the selected physical coordinate area. The desired color modification could then be made to the heavily shadowed face alone.

In the agricultural example previously discussed, once the color signature or trajectory for the blighted grain has been obtained, the mask generation circuitry illustrated in FIG. 7 would identify all areas of the image having the blighted grain. Hard copy output of this image could be obtained through photographic means or color plotting, or the CPU could be instructed to integrate the area represented by each of the flagged pixels to provide an acreage assessment of the blighted grain contained within the aerial photograph.

It is obvious that various modifications to the circuitry described in FIG. 7 could be made to enable the functions of FIG. 7 to be carried out purely in software, in firmware, or in specially prepared analog or digital hardware. The more hardware used, the less flexible the system in terms of modifying the masks, the function generator, or the input colors selected for detection. The device illustrated in FIG. 7 provides a unique high-speed digital processing circuit that is capable of evaluating over a million pixels (each of which has a possible 16 million combination of coordinate values) in approximately 20 nanoseconds per pixel. This enables the entire 1024×1024 pixel array to be evaluated and modified within the 1/30th of a second frame rate of the high-resolution color monitor.

Figure 8:
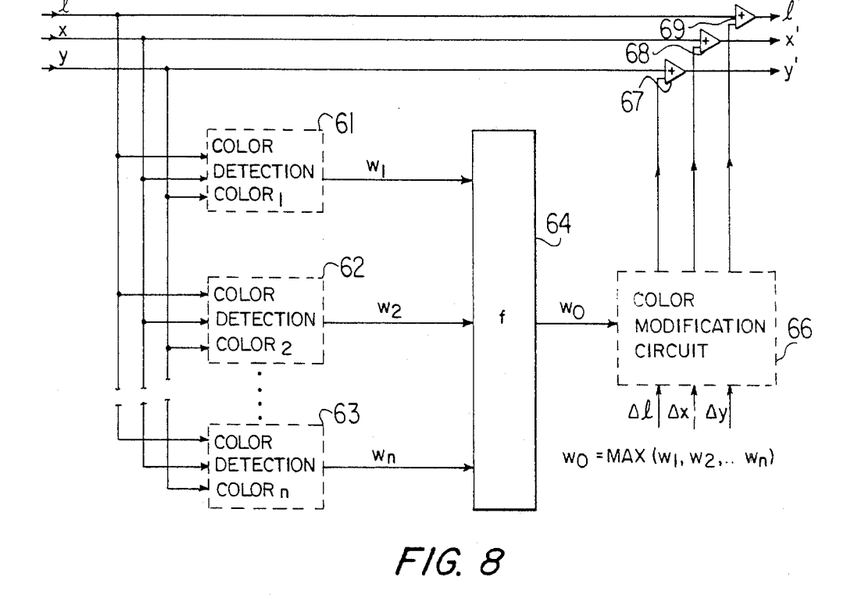
FIG. 8 is a block diagram illustration of an alternate embodiment of the invention having the ability to detect plural color values simultaneously.
Figures 9, 10A, 10B:
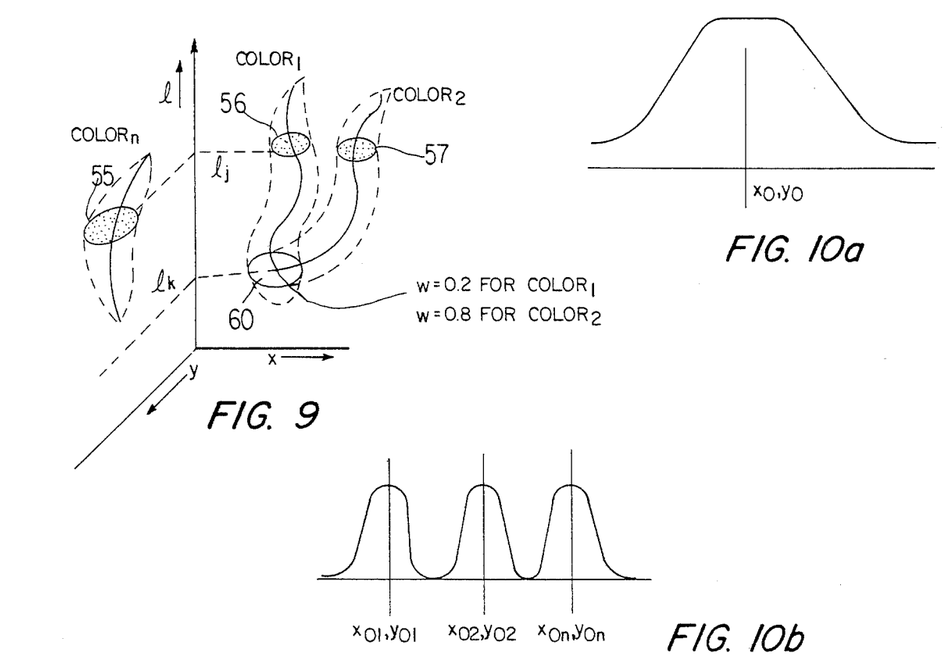
FIG. 9 is a diagrammatic view of a three-dimensional color universe having three color sub-spaces defined therein.
FIG. 10A is a graph of a bell curve derived from plotting all x,y values available at luminance value $l_j$ in FIG. 9.
FIG. 10B is a graph of the same x,y values illustrated in FIG. 10A, at the luminance value $l_j$ of FIG. 9, for which a "multi-model analysis" was performed.

FIGS. 8-10 illustrate the application of the present invention to plural color recognition and modification. The incoming pixel samples are converted to x,y color coordinates as a function of l as previously explained. FIG. 9 is a diagrammatic illustration of color 1, color 2, and color n defined within a color universe, wherein color 1 and color 2 have overlapping color values for portions of their color curves. A plurality of distributed x,y coordinate values is illustrated at 55, 56 and 57 for a single luminous value $l_j$. If simple averaging techniques were employed to calculate the parameters, the data in the form shown in FIGS. 10a and 10b could not be distinguished.

A definition of color in this manner would be totally inaccurate, or else would be so broad as to include many unwanted colors. It is, therefore, necessary to perform additional color evaluations of the x,y coordinate values, such as a "second moment" test to determine if there are single or plural distributions. It should be noted that a "multi-model analysis" at luminous value $l_j$ should reveal the three distributions $x_{01}$, $y_{01}$; $x_{02}$, $y_{02}$ and $x_{on}$, $y_{on}$ illustrated in FIG. 10b. At luminous value $l_K$ only a single $x_o$, $y_o$ value would be determined because color 1 and color 2 overlap each other at that luminance plane. The plural distribution of $x_o,y_o$ coordinate values for color 1, color 2 and color n would then be loaded into the lookup tables of color detection circuits 61, 62, . . . , 63 (FIG. 8) with the coordinate values in overlapping plane 60 loaded in both color detector 1 and color detector 2.

Each of the color detectors 61, 62 and 63 then generates a weighting function w for each incoming pixel having color coordinate values that fall within the space defined by its color curve and weighting function. A second evaluation is then performed by function generator 64, wherein $w_o = \max(w_1, w_2, \ldots, w_N)$. For example, the pixel value 65, indicated in FIG. 9 would generate two different weighting values. The output of detector 61, w, might equal 0.2 for color 1 inasmuch as it lies near the outer boundary of the color sub-space for color 1. The output of color detector 62, $w_2$ might equal 0.8, inasmuch as the pixel lies near the $x_o, y_o$ coordinates for color 2. Function generator 2 therefore assigns the pixel a weighting factor of 0.8. If 0.2 or 1.0 were assigned to the pixel, any future modifications to the color values would be unduly distorted. The color modification circuit 66 is constructed from lookup tables as discussed previously with respect to FIG. 7. Adding circuits 67, 68 and 69 (FIG. 8) add in the operator selected values from the lookup tables in 66 as discussed previously with respect to FIG. 7.

We claim:

1. A method of color detection and modification for use in the processing of colored images, comprising the steps of:
   a. selecting a set of parameters to define color variations, comprising one parameter which varies at least approximately with luminance and two other parameters varying with chromaticity;
   b. deriving sets of signals based on these parameters representing sample points on a sample curve defining the variations of chromaticity throughout the luminance range of the samples, along which curve maximum correction is required;
   c. obtaining a succession of sets of input signals based on said parameters, each set representing an element of the original image to be reproduced;
   d. obtaining from each of said sets of input color signals
      (1) a luminance factor signal;
      (2) chromaticity deviation signals representing the differences respectively between the signal values for the said other two parameters of the obtained set and their respective values on an extended curve which extends from the said sample curve to cover the entire luminance range of the input color signals, the values being taken at a point on the curve defined by the luminance value of the obtained set of signals;
      (3) deriving from the chromaticity deviation signals and the luminance factor signal a weighting signal whose value is a predetermined function of said signals.
   e. combining each of a predetermined set of color correction values with the weighting signal to derive a set of modified color correction values;
   f. combining each of the said set of modified color correction values with its corresponding set of input color signals to produce corrected output color signals; and
   g. wherein the succession of sets of output color signals represents the original image with selective color enhancement.

2. A method of color detection and modification in accordance with claim 1, wherein said luminance factor signal has a value of zero for values of luminance lying at or between the greatest and least values of luminance for which samples were obtained, and has a value greater than zero for all other values of luminance.

3. A method of color detection and modification in accordance with claim 2, wherein the luminance factor signal varies linearly with luminance over those values of luminance which lie outside the range between the greatest and least values of luminance for which samples were obtained, the luminance factor signal being a continuous function over the entire luminance range.

4. A method of color correction in accordance with claim 1, wherein said extended curve defines values of the two other parameters which tend towards a pair of predetermined values for the two extreme values in the entire range of obtained luminance signal values, and which define that pair of predetermined values at the said extreme luminance signal values.

5. A method in accordance with claim 1, 2, 3 or 4, wherein said predetermined function of said signals is also dependent on a predetermined spread signal, such that the weighting signal has a high level when said differences are low, and decreases smoothly to zero as said differences become higher;
   and wherein said spread signal controls the rate at which the weighting signal decreases to zero, such that for high values of the spread signal, the weighting signal decreases more slowly to zero with increasing values of the difference signals.

6. A method in accordance with claim 1, 2, 3 or 4, wherein said luminance parameter represents pure luminance, the two other parameters being the Commission Internationale de L'Eclairage (C.I.E.) x and y components.

7. A method in accordance with claim 1, 2, 3 or 4 wherein said predetermined function of said signals is also dependent on a predetermined spead signal, such that the weighting signal has a high level when said differences are low, and decreases smoothly to zero as said differences become higher, said spread signal being calculated as a function of luminance.

8. A method in accordance with claim 1, 2, 3 or 4, wherein said luminance parameter represents pure luminance, the other two parameters being the C.I.E. u and v color components.

9. A method in accordance with claim 1, 2, 3 or 4, wherein in said step of combining the color correction values with the weighting signal, each color correction value is multiplied by the weighting signal.

10. A method in accordance with claim 1, 2, 3 or 4, wherein said sample curve defining variation of hue and saturation throughout the luminance range of the sample is a continuous curve comprising linear portions representing a linear interpolation between said sample points.

11. A method in accordance with claim 1, wherein said extended curve is extended from said sample curve by linear extrapolation at each end of the luminance range of the samples, the extended curve defining a pair of predetermined values for the two extreme values in the entire range of obtained luminance signal values.

12. A method of color correction in accordance with claim 1, wherein said weighting signal varies with said difference values and said luminance factor signal in such a manner that a sufficient departure of any one of the difference values from zero reduces to zero the difference between the modified color correction values and the predetermined set of color correction values.

13. A method in accordance with claim 12, wherein said weighting signal is equal to the product of a first predetermined function of the luminance deviation signal, a second predetermined function of a first one of the chromaticity deviation signals, and a third predetermined function of a second one of the chromaticity deviation signals, each of said functions assuming a predetermined constant value for zero difference values, and declining smoothly and monotonically from said predetermined value to zero for other difference values.

14. A method in accordance with claim 12, wherein said weighting signal is equal to $\exp[-S(pl_2 + \delta x^2 + \delta y^2)]$, where S is a predetermined constant, pl is the luminance factor value, and δx and δy are the chromaticity deviation signal values.

15. A method in accordance with claim 12, wherein said weighting signal is equal to unity minus the product of a predetermined constant value and the largest of the absolute values of said chromaticity and luminance factor signals if this value is positive, the error factor signal otherwise being zero.

16. A method in accordance with claim 13, wherein said weighting signal varies in accordance with said chromaticity deviation signals and said luminance factor signal in a manner defined by the following expression:

Let $P = A - B$ largest of $[(pl)(\delta x)(\delta y)]$

If $P \geq 1$   $w = 1$

If $0 \leq P \leq 1$  $w = P$

If $P < 0$   $w = 0$ where w is the weighting signal and A,B are predetermined constants, $A \geq 1$, $B > 0$.

17. Means for detecting and modifying color values in portions of a color image, said means comprising:
  a. input means for receiving input color signals which represent a colored image, and for converting said image into a plurality of pixel portions, each pixel having a discrete location;
  b. digital conversion means for converting the input color signal at each pixel into three digital coordinate values, said first coordinate value representing an approximation of luminance, said second and third coordinate values representing chromaticity;
  c. sampling means to selectively sample one or more of said pixels representing a color value for which detection and modification is desired;
  d. means for storing said second and third chromaticity coordinate values as a function of said luminance coordinate values for each pixel sampled by said sampling means, said means defining a three-dimensional curve in color space when said coordinate values are stored in a memory means, said luminous coordinate defining the longitudinal path of said curve while said second and third chromaticity values define the LOCI of said curve at each level of luminance sampled;
  e. function generator means for defining a three-dimensional color sub-space around said color curve, said function means defining a weighted value for each pixel having color coordinate values that fall within said three-dimensional color sub-spaces;
  f. comparator means for sequentially sampling each pixel in said image and comparing the color coordinate values of said pixel with the color coordinate values of the color sub-space defined by said function generator means; and
  g. means responsive to said comparator means to combine a second color signal with said input signal for each pixel having color coordinate values falling within said defined color sub-space.

18. Means for detecting and modifying color as claimed in claim 17, wherein the first coordinate value (l) corresponds to luminance, said second (x) and third (y) chromaticity coordinates define values of hue and saturation, where hue is defined as an angle of rotation around a white or neutral point, and saturation is defined as the radius from said point.

19. Means for detecting and modifying color as claimed in claim 17, wherein said first coordinate value corresponds to luminance (l), as follows:

$l = aR + bG + cB$ wherein
R represents red
G represents green
B represents blue
and a, b and c represent any constant greater than 0.

20. Means for detecting and modifying color as claimed in claim 17, wherein said function generator means varies the weighted value as the distance from the color coordinate values to the color curve varies.

21. Means for detecting and modifying colors as claimed in claim 20, wherein said function generator means varies the weighted value as follows:

$w = T_6[T_1(l) + T_4(\delta x) + T_5(\delta y)]$ wherein w equals the weighted value, l represents the luminance coordinate value, δx and δy represent the second and third chromaticity coordinate values at said comparator means; $T_1$ is a function table; $T_4$ and $T_5$ are Log tables, and $T_6$ is an exponential table.

22. Means for detecting and modifying color as claimed in claim 17, wherein said means further includes additional function means to extrapolate luminous values above and below the luminous values obtained by said sampling means.

23. Means for detecting and modifying color as claimed in claim 17, wherein said memory means comprises three lookup tables stored in a random access memory means.

24. Means for detecting and modifying color as claimed in claim 17, wherein said means responsive to said weighted value further includes color generating means having independently variable values of luminance and chromaticity, said means also including an operator control whereby the operator may independently vary the luminance or chromaticity of the second color signal as it is combined with the first color signal.

25. Means for detecting and modifying color as claimed in claim 17, wherein said means further includes a mask generating means to identify the pixels detected by the function generator means.

26. Means for detecting and modifying color as claimed in claim 24, wherein said means further includes a color insertion means and a threshold means whereby said color insertion means interrupts the original color signal and inserts the second color signal whenever the weighted value exceeds a predetermined level.

27. Means for detecting and modifying color as claimed in claim 17, wherein three memory planes are arrayed with said pixels; said first memory plane storing the digital luminous coordinate values, the second memory plane storing the second color coordinate digital value, and the third memory plane storing the third color coordinate digital value, said memory planes providing a second storage means for both input color signals and combined color signals on a pixel-by-pixel basis.

28. Means for detecting and modifying color as claimed in claim 27, wherein said means further includes an integrating circuit for deriving the total proportional area of all pixels assigned a weighted value.

29. Means for detecting and modifying color as claimed in claim 17, wherein said means further defines interpolation means to provide a continuous color curve that defines variations of hue and saturation through the entire luminance range of the image.

30. Means for detecting and modifying color as claimed in claim 18, wherein sample values of x are averaged, and sample values of y are averaged when said sampling means selects a pixel with a similar luminous l value.

31. Means for detecting and modifying color as claimed in claim 18, wherein the x,y coordinates of the color curve are determined by least square approximations when plural values of x and y are obtained.

32. Digital means for the automatic detection of color, said means comprising:
   a. means for generating a three-dimensional color curve for a sample color to be detected, said trajectory defining variations of hue and saturation throughout the luminous range of the sample;
   b. memory means for storing digital coordinate values of said sample color curve, wherein chromaticity coordinate values are stored as a function of said luminance coordinate values;
   c. function generating means to define a three-dimensional color sub-space around said color curve, the longitudinal dimensions of said sub-space being determined by said luminous coordinate values and the cross-section of said sub-space being determined by the chromaticity coordinate values;
   d. input means for receiving additional color signals to be evaluated and compared with said sample color, said input means converting said additional color signals to three digital coordinate values, the first coordinate value representing luminance, the second and third coordinate values representing chromaticity;
   e. comparator means to compare the coordinate values of said incoming additional color values to the coordinate value of said three-dimensional color sub-space defined by said function generating means; and
   f. threshold means for receiving the output of said comparator means and detecting any incoming color signal having coordinate values that are defined within the coordinate values defined by said function generating means.

33. Means for detecting and modifying color as claimed in claim 32, wherein said first coordinate value corresponds to luminance as follows:

$$l = aR + bG + cB$$

wherein
  R represents red
  G represents green
  B represents blue
and a, b and c represent any constant greater than 0.

34. Means for detecting and modifying color as claimed in claim 32, wherein said means further includes additional function means to extrapolate chromaticity values for luminous values above and below the luminous values of said sample.

35. Means for detecting and modifying color as claimed in claim 27, wherein said means further includes an integrating circuit for deriving the total proportional area of all pixels assigned a weighted value.

36. Digital means for the automatic detection of color as claimed in claim 32, wherein said memory means comprises first, second and third lookup tables in a random access memory.

37. Digital means for the automatic detection of color as claimed in claim 32, wherein said function generator means defines the color sub-space as follows:

$$w = T_6[T_1(l) + T_4(\delta x) + T_5(\delta y)]$$

wherein w is a signal applied to the threshold means to detect said color signal when w rises above a predetermined value, $(\delta x)(\delta y)$ being chromaticity values at said comparator means, $T_1$ being a function table, $T_4$ and $T_5$ being log tables, and $T_6$ being an exponential table.

38. A method of automatically detecting color with digital electronics, said method comprising,
   (a) generating a digital three-dimensional color trajectory for a first color to be detected, said trajectory defining chromaticity values as a function of luminance values, the first coordinate value of the three-dimensions representing luminance, and the second and third coordinate values representing chromaticity,
   (b) extending the digital coordinate values of the first color throughout the luminance range, and storing the chromaticity values as functions of the luminance value, for each value of luminance,
   (c) defining a three-dimensional color sub-space about the color trajectory, wherein the longitudinal values are defined by a function generator means beginning at the chromaticity values of the trajectory for that level of luminance,
   (d) converting incoming color signals to be detected into three digital coordinate values, wherein the first coordinate value represents luminance, and the second and third coordinate values represent chromaticity,
   (e) comparing the three coordinate values to the coordinate values of the color sub-space defined by the function generator means,
   (f) detecting each compared color signal having coordinate values that fall within the three-dimensional color sub-space.

39. A method of automatically detecting and modifying the color in a color image with digital electronics, said method comprising,
   (a) digitizing a color image as an X-Y array with a plurality of pixels, each pixel having a discrete location in the X-Y array,
   (b) converting the color values of each pixel into three digital coordinate values, with a first value representing luminance, and second and third values representing chromaticity,
   (c) storing the three digital coordinate values for each pixel, wherein the chromaticity values are stored as functions of luminance values;
   (d) identifying a color value for which detection and modification is desired by selectively sampling one or more of the pixels and generating a three-dimensional color trajectory for the color to be detected and modified.
   (e) defining a three dimensional color sub-space about the color trajectory, wherein the longitudinal values are defined by the luminance value, and the cross sectional values are defined by a function generator means beginning at the chromaticity values of the trajectory for that level of luminance, (f) comparing the three digital coordinate values of each pixel in the image array to the digital coordinants of the color sub-space defined by the function generator means, (g) identifying each pixel having color coordinate values that fall within said defined color sub-space, (h) modifying the digital coordinate values of each pixel identified in step (g).

40. A method of automatic detecting or modifying color as claimed in claim 38 or 39 wherein the first coordinate value (l) corresponds to luminance, and the second (x) and third (y) chromaticity coordinates defined values of hue and saturation, wherein hue is defined as an angular rotation around a white or neutral point and saturation is defined as a radius from said point.

41. A method of automatically detecting or modifying colors as claimed in claim 38 or 39 wherein the first coordinate value corresponds to luminance (l), as follows:

$$l = aR + bG + cB$$

wherein
R represents red
G represents green
B represents hue
and a, b and c represent any constant greater than 0.

42. A method of automatic detecting or modifying color as claimed in claim 38 or 39 wherein the function generator creates and varies a weighted value assigned the color sub-space as follows:

$$w = T_6[T_1(l) - T_4(\delta x) + T_5(\delta y)]$$

where w equals the weighted value, represents luminance coordinate value $\delta x$ and $\delta y$ represent the second and third chromaticity coordinate values wherein said coordinate values are compared; $T_1$ being a function table; $T_4$ and $T_5$ being Log table, and $T_6$ being an exponential table.

43. A method of automatically detecting and modifying color as claimed in claim 39 which further includes the step of generating a mask to identify pixels detected by the function generator means.

44. A method of automatically detecting and modifying color as claimed in claim 39 which further includes the step of storing each of the modified digital coordinate values on a pixel by pixel basis.

45. A method of automatically detecting and modifying color as claimed in claim 39 and 45 wherein the digital coordinate values are stored in three memory planes.

* * * * *